US008654107B2

(12) United States Patent
Yeh et al.
(10) Patent No.: US 8,654,107 B2
(45) Date of Patent: Feb. 18, 2014

(54) SHADING SIGNAL GENERATING CIRCUIT

(75) Inventors: Chien-Lin Yeh, Taoyuan (TW); Liang-Hua Yeh, Taoyuan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 543 days.

(21) Appl. No.: 13/029,750

(22) Filed: Feb. 17, 2011

(65) Prior Publication Data

US 2012/0105493 A1 May 3, 2012

(30) Foreign Application Priority Data

Oct. 29, 2010 (TW) ............................... 99137218 A

(51) Int. Cl.
*G06F 3/038* (2013.01)
*G09G 5/00* (2006.01)

(52) U.S. Cl.
USPC .............. 345/204; 345/99; 345/100; 345/211

(58) Field of Classification Search
None
See application file for complete search history.

(56) References Cited

U.S. PATENT DOCUMENTS 6,084,580 A * 7/2000 Takahashi et al. ............ 345/211
7,898,514 B2 * 3/2011 Kim ................................ 345/92
2002/0150199 A1 10/2002 Sasaki et al.
2005/0078102 A1 * 4/2005 Kim .............................. 345/204
2005/0088391 A1 * 4/2005 Kim ................................ 345/94
2006/0077163 A1 * 4/2006 Yanagi et al. ................... 345/94
2006/0290640 A1 * 12/2006 Park ................................ 345/98
2009/0073096 A1 * 3/2009 Mittal et al. .................... 345/82
2010/0245333 A1 * 9/2010 Hsu et al. ....................... 345/213
2011/0157123 A1 * 6/2011 Cho .............................. 345/211

FOREIGN PATENT DOCUMENTS

TW 200933568 8/2009

* cited by examiner

*Primary Examiner* — Amare Mengistu
*Assistant Examiner* — Antonio Xavier
(74) *Attorney, Agent, or Firm* — Muncy, Geissler, Olds & Lowe PLLC

(57) ABSTRACT

A shading signal generating circuit includes an output port, a first switch, a second switch, a third switch, a first control unit, a second control unit, and a resistor. The output port is electrically connected to the first switch, the second switch, and the third switch. The first switch is electrically connected to a first voltage source and switched on according to a clock signal. The second switch is electrically connected to a second voltage source. The first control unit converts the clock signal to an inverse clock signal, thereby outputting a switch signal for switching on the second switch. The resistor is connected between a third voltage source and the third switch in series. The third switch controls the electric connection between the output port and the third voltage source. The second control unit switches on the third switch according to the inverse clock signal and the switch signal.

9 Claims, 3 Drawing Sheets

SHADING SIGNAL GENERATING CIRCUIT

CROSS-REFERENCE TO RELATED APPLICATION

This application claims the benefit of Taiwan Patent Application No. 099137218, filed on Oct. 29, 2010, which is hereby incorporated by reference for all purposes as if fully set forth herein.

BACKGROUND OF THE INVENTION

1. Field of Invention

The present invention relates to a circuit capable of generating an electric signal, and in particular, to a shading signal generating circuit.

2. Related Art

Currently, in a thin film transistor liquid crystal display, a plurality of transistors are usually used to control the arrangement of liquid crystal molecules. In the liquid crystal display, a transistor array substrate is a necessary and important part. The transistor array substrate usually includes a plurality of pixel units, a plurality of scan lines, and a plurality of data lines.

The pixel units are electrically connected to the scan lines and the data lines. Each of the pixel units usually includes a transistor and a pixel electrode electrically connected to the transistor. The scan lines and the data lines are electrically connected to the transistors. Each of the scan lines can transmit a gate signal. Mostly, the gate signal is generated by a gate driver and is used for switching on and off the transistor to control the data line to output a pixel voltage to the pixel electrode, so as to charge a liquid crystal capacitor corresponding to the pixel unit, thereby enabling the liquid crystal display to display images.

However, feedthrough voltages generated by the pixel units are not consistent due to the influence of capacity coupling effects and loads. Generally speaking, a large difference exists between a feedthrough voltage generated by the pixel unit close to the gate driver and a feedthrough voltage generated by the pixel unit away from the gate driver, thereby resulting in the flicker of a frame.

SUMMARY OF THE INVENTION

The present invention is directed to a shading signal generating circuit, and a shading signal generated by the shading signal generating circuit enables to reduce the differences between feedthrough voltages generated from pixel units.

The present invention provides a shading signal generating circuit applied to a liquid crystal display panel. The shading signal generating circuit includes an output port, a first switch, a second switch, a first control unit, a resistor, a third switch, and a second control unit. The first switch is electrically connected to the output port and a first voltage source and receives a clock signal. When the clock signal switches on the first switch, the output port is electrically connected to the first voltage source. The second switch is electrically connected to the output port and a second voltage source. When the second switch is switched on, the output port is electrically connected to the second voltage source. The first control unit is electrically connected to the second switch and converts the clock signal to an inverse clock signal. The first control unit outputs a switch signal according to the inverse clock signal. The switch signal is used for switching on the second switch. The third switch is electrically connected to the output port and the resistor. The resistor is connected between a third voltage source and the third switch in series. When the third switch is switched on, the output port is electrically connected to the third voltage source. The output port outputs a voltage decay signal. The second control unit is electrically connected to the first control unit and the third switch. The second control unit switches on the third switch according to the inverse clock signal and the switch signal.

Base on the above statement, the shading signal generating circuit in the present invention uses three switches (i.e. the first switch, the second switch, and the third switch), a first control unit, a second control unit, and a resistor, so that the shading signal generating circuit can output the shading signal from an output port to a liquid crystal display panel. Therefore, the present invention enables to reduce the differences between the feedthrough voltages of the pixel units, thereby reducing the probability of the flicker of a frame.

In order to make the aforementioned features and advantages of the present invention more comprehensible, embodiments accompanied with figures are described in detail below.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
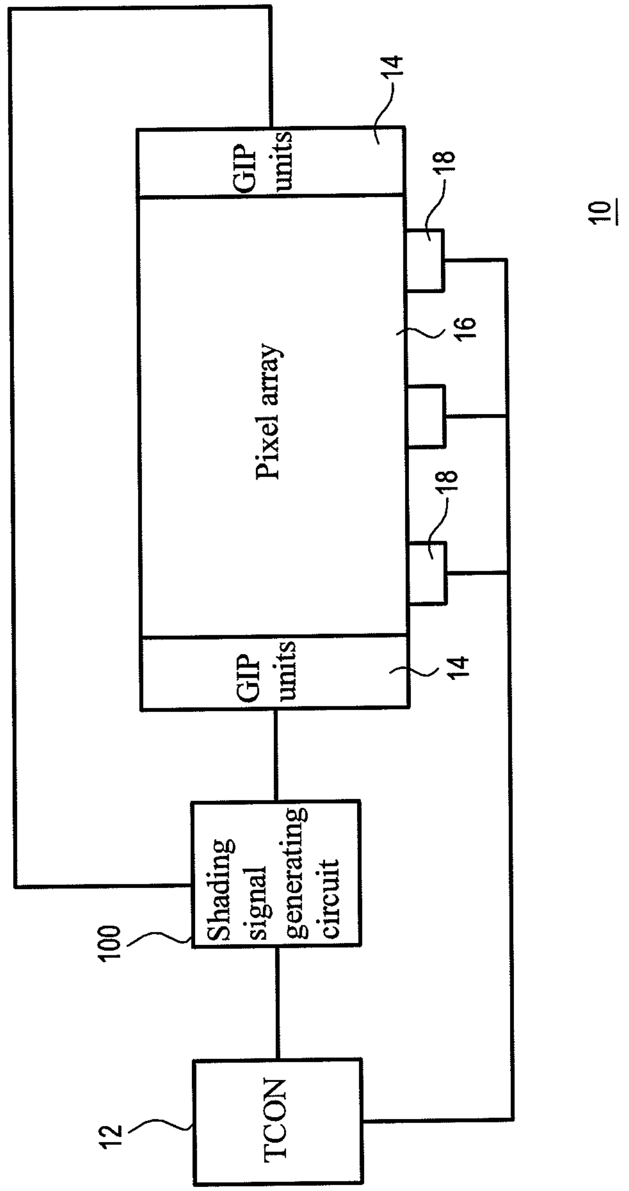
FIG. 1 is a schematic block diagram of a liquid crystal display panel to which a shading signal generating circuit according to an embodiment of the present invention can be applied.

FIG. 1 is a schematic block diagram of a liquid crystal display panel to which a shading signal generating circuit according to an embodiment of the present invention can be applied. Referring to FIG. 1, the shading signal generating circuit 100 in this embodiment can be applied to the liquid crystal display panel 10. The liquid crystal display panel 10 may be of a gate-in-panel (GIP) type panel. However, it should be noted that the present invention does not limit this types of liquid crystal display panels to which the shading signal generating circuit 100 can be applied. That is to say, it is not limited that the shading signal generating circuit 100 is only applied to the GIP panel.

The liquid crystal display panel 10 may include a time controller (TCON) 12, a plurality of gate-in-panel (GIP) units 14, a pixel array 16, a plurality of driver units 18, and the shading signal generating circuit 100. The TCON 12 is electrically connected to the shading signal generating circuit 100, and the shading signal generating circuit 100 is electrically connected to the GIP units 14. In addition, the TCON 12 and the shading signal generating circuit 100 may be integrated on a circuit board. The GIP units 14 and the pixel array 16 may be integrated on a transparent board.

The pixel array 16 is electrically connected to the GIP units 14 and the driver units 18, and the pixel array 16 may be the same as a conventional transistor array substrate. For example, the pixel array 16 may include a plurality of pixel units, a plurality of scan lines, and a plurality of data lines (the pixel units, the scan lines, and the data lines are all not shown), and the pixel units are electrically connected to the scan lines and the data lines. Each of the pixel units includes a transistor and a pixel electrode electrically connected to the transistor. The scan lines and the data lines are all electrically connected to the transistors.

Accordingly, the scan lines are electrically connected to the GIP units 14, and the data lines are electrically connected to the driver units 18. Therefore, the pixel array 16 is electrically connected to the GIP units 14 and the driver units 18. Additionally, each of the driver units 18 may be, for example, a source driver integrated circuit (IC), and the GIP units 14 may have shift register circuits.

The TCON 12 can generate a clock signal and input the clock signal to the shading signal generating circuit 100 and the driver units 18. According to the clock signal, the driver units 18 can output pixel voltages to the pixel array 16, and the shading signal generating circuit 100 can generate a shading signal and input the shading signal to the pixel array 16, thereby enabling the liquid crystal display panel 10 to display an image.

Figure 2:
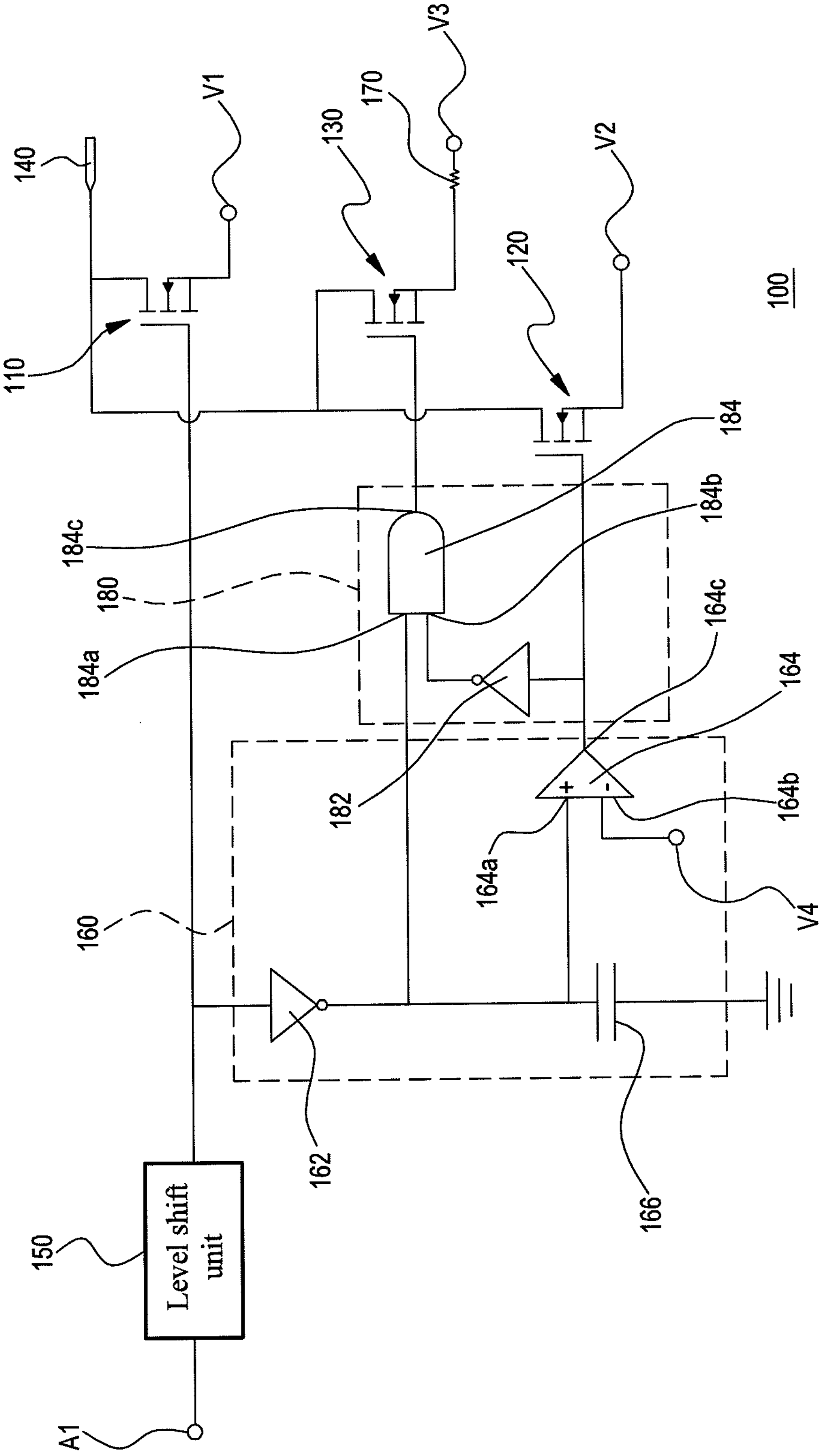
FIG. 2 is a schematic circuit diagram of the shading signal generating circuit in FIG. 1.

About the shading signal generating circuit 100, refer to FIG. 2, which is a schematic circuit diagram of the shading signal generating circuit 100 in FIG. 1. According to the circuit show in FIG. 2, the shading signal generating circuit 100 includes a first switch 110, a second switch 120, a third switch 130, and an output port 140. The first switch 110, the second switch 120, and the third switch 130 are electrically connected to the output port 140. The shading signal generated by the shading signal generating circuit 100 is output from the output port 140 to the GIP units 14 (see FIG. 1), and therefore the output port 140 is electrically connected to the GIP units 14.

The first switch 110, the second switch 120, and the third switch 130 all may be field-effect transistors (FETs), for example, n-type metal-oxide-semiconductor field-effect transistors (NMOSFETs). The following description of the shading signal generating circuit 100 is based on that the first switch 110, the second switch 120, and the third switch 130 are all the n-type metal-oxide-semiconductor field-effect transistors. However, it should be noted that the present invention does not limit that the first switch 110, the second switch 120, and the third switch 130 are all the field-effect transistors. Thus, the types of the first switch 110, the second switch 120, and the third switch 130 respectively in the following are just for example and not limit the present invention.

The first switch 110 is further electrically connected to a first voltage source V1 and able to determine whether the output port 140 and the first voltage source V1 are to be electrically connected to each other. According to FIG. 2, a source of the first switch 110 is electrically connected to the first voltage source V1, and a drain of the first switch 110 is electrically connected to the output port 140. When the first switch 110 is switched on, the output port 140 is electrically connected to the first voltage source V1. Conversely, when the first switch 110 is switched off, the output port 140 is not electrically connected to the first voltage source V1 temporarily.

The first switch 110 receives a clock signal input to a gate of the first switch 110. Therefore, the switching on and off of the first switch 110 is controlled by the clock signal. The clock signal has a highest voltage level and a lowest voltage level. The highest voltage level in the clock signal can mean a logic level "1", and the lowest voltage level can mean a logic level "0". When the clock signal received by the first switch 110 is at the highest voltage level, the first switch 110 is switched on. In contrast, when the clock signal received by the first switch 110 is at the lowest voltage level, the first switch 110 is switched off.

The shading signal generating circuit 100 may further include a level shift unit 150, and the clock signal for switching on and off the first switch 110 may be provided by the level shift unit 150. Specifically, the level shift unit 150 is electrically connected to the first switch 110 and the TCON 12 (see FIG. 1). A contact A1 shown in FIG. 2 is electrically connected to the TCON 12. The level shift unit 150 is used to convert an initial clock signal to a clock signal, and the initial clock signal is a clock signal generated by the TCON 12.

In this embodiment, the level shift unit 150 does not change a frequency of the initial clock signal and only changes voltage amplitude of the initial clock signal. That is to say, the level shift unit 150 only changes a voltage difference between the highest voltage level and the lowest voltage level in the initial clock signal. Therefore, the frequency of the initial clock signal is substantially the same as the frequency of the clock signal received by the first switch 110.

It should be noted that in other embodiments, the level shift unit 150 may be built in the TCON 12, so that the first switch 110 can receive the clock signal generated by the TCON 12 directly. Therefore, it is not necessary for the shading signal generating circuit 100 to include the level shift unit 150. That is to say, the level shift unit 150 is an optional component other than a necessary component of the shading signal generating circuit 100.

The second switch 120 is further electrically connected to a second voltage source V2 and can determine whether the output port 140 and the second voltage source V2 are to be electrically connected to each other. According to FIG. 2, a source of the second switch 120 is electrically connected to the second voltage source V2, and a drain of the second switch 120 is electrically connected to the output port 140. When the second switch 120 is switched on, the output port 140 is electrically connected to the second voltage source V2. In contrast, when the second switch 120 is switched off, the output port 140 is not electrically connected to the second voltage source V2 temporarily. In addition, a voltage level of the first voltage source V1 may be higher than a voltage level of the second voltage source V2, and the voltage level of the second voltage source V2 may be lower than 0 volt.

The shading signal generating circuit 100 further includes a first control unit 160, and the first control unit 160 can control the switching on and off of the second switch 120. Specifically, the first control unit 160 is electrically connected to the second switch 120 and the level shift unit 150 and can convert a clock signal to an inverse clock signal, wherein the clock signal is received by the first switch 110. The first control unit 160 can output a switch signal according to the inverse clock signal, and the switch signal can switch on and off the second switch 120.

The first control unit 160 has a plurality of circuit structures, and one of the circuit structures is described below according to FIG. 2. However, it should be noted that the circuit structure of the first control unit 160 shown in FIG. 2 is one of many embodiments in the present invention. Therefore, it is emphasized herein that the first control unit 160 shown in FIG. 2 is only for example and not limits the present invention.

Referring to FIG. 2, the first control unit 160 includes an inverter 162. The inverter 162 may be electrically connected to the level shift unit 150 and can convert a clock signal from the level shift unit 150 to an inverse clock signal. Therefore, the above inverse clock signal may be generated by the inverter 162. Additionally, since the level shift unit 150 is not a necessary component of the present invention, the inverter 162 may directly convert a clock signal generated by the TCON 12 to an inverse clock signal in other embodiments.

The first control unit 160 further includes a comparator 164, and the comparator 164 may generate the above switch signal. The comparator 164 has a non-inverting input 164*a*, an inverting input 164*b*, and an output 164*c*. The non-inverting input 164*a* is electrically connected to the inverter 162. The output 164*c* is electrically connected to the second switch 120. The inverting input 164*b* is electrically connected to a reference voltage source V4. The switch signal is output from the output 164*c* to the second switch 120.

A waveform of the above switch signal is substantially the same as a waveform of the clock signal, so that the switch signal has a highest voltage level and a lowest voltage level, in which the highest voltage level can mean the logic level "1", and the lowest voltage level can mean the logic level "0". In this embodiment, when the switch signal received by the second switch 120 is at the highest voltage level, the second switch 120 is switched on. In contrast, when the switch signal received by the second switch 120 is at the lowest voltage level, the second switch 120 is switched off. Thus, the switch signal can switch on and off the second switch 120.

The first control unit 160 may further include a capacitor 166, and the capacitor 166 is electrically connected to the inverter 162 and the non-inverting input 164*a*. The capacitor 166 can receive an inverse clock signal from the inverter 162. When the inverse clock signal received by the capacitor 166 is at the highest voltage level, the capacitor 166 is charged, so that a voltage level of the capacitor 166 rises gradually. The comparator 164 can detect the voltage level in the capacitor 166 through the non-inverting input 164*a* and detect the voltage level of the reference voltage source V4 through the inverting input 164*b*. The comparator 164 can compare the voltage levels both in the capacitor 166 and the reference voltage source V4 to determine which one is higher or lower.

When the voltage level in the capacitor 166 being charged is not higher than the voltage level of the reference voltage source V4, the switch signal output by the comparator 164 to the second switch 120 is at the lowest voltage level at this time, and therefore the second switch 120 is off. When the voltage level in the capacitor 166 being charged is higher than the voltage level of the reference voltage source V4, the switch signal output by the comparator 164 to the second switch 120 is at the highest voltage level at this time, and therefore the second switch 120 is on.

The third switch 130 is further electrically connected to a third voltage source V3 and can determine whether the output port 140 and the third voltage source V3 are to be electrically connected to each other. According to FIG. 2, a source of the third switch 130 is electrically connected to the third voltage source V3, and a drain of the third switch 130 is electrically connected to the output port 140. When the third switch 130 is switched on, the output port 140 is electrically connected to the third voltage source V3. In contrast, when the third switch 130 is switched off, the output port 140 is not electrically connected to the third voltage source V3 temporarily.

About the electrical connection between the third switch 130 and the third voltage source V3, the shading signal generating circuit 100 further includes a resistor 170. The source of the third switch 130 is further electrically connected to the resistor 170, and the resistor 170 is connected between the third voltage source V3 and the third switch 130 in series. Additionally, the voltage level of the first voltage source V1 may be higher than the voltage level of the third voltage source V3, and the voltage level of the third voltage source V3 may be higher than the voltage level of the second voltage source V2.

The shading signal generating circuit 100 further includes a second control unit 180, and the second control unit 180 is electrically connected to the first control unit 160 and the third switch 130. According to FIG. 2, the second control unit 180 is electrically connected to the inverter 162, the output 164*c* of the comparator 164, and a gate of the third switch 130, thereby receiving the inverse clock signal and the switch signal. In addition, the second control unit 180 can control the switching on and off of the third switch 130 according to the inverse clock signal and the switch signal.

The second control unit 180 has a plurality of circuit structures, and one of the circuit structures is described below according to FIG. 2. However, it should be noted that the circuit structure of the second control unit 180 shown in FIG. 2 is one of many embodiments in the present invention. Therefore, it is emphasized herein that the second control unit 180 shown in FIG. 2 is only for example and not limits the present invention.

The second control unit 180 includes an inverter 182 and a logic gate 184. The logic gate 184 has a first input 184*a*, a second input 184*b*, and an output 184*c*. The first input 184*a* is electrically connected to the inverter 162 of the first control unit 160 and can receive the inverse clock signal from the inverter 162. The second input 184*b* is electrically connected to the inverter 182. The output 184*c* is electrically connected to the gate of the third switch 130, so that the logic gate 184 can control the switching on and off of the third switch 130.

The inverter 182 is electrically connected to the first control unit 160 and is electrically connected to the output 164*c* of the comparator 164, so that the inverter 182 can convert the switch signal from the comparator 164 to an inverse switch signal and then input the inverse switch signal to the second input 184*b* of the logic gate 184. Thus, the logic gate 184 can receive the inverse clock signal from the inverter 162 and the inverse switch signal from the inverter 182. Additionally, the inverse switch signal also has a highest voltage level and a lowest voltage level, like the switch signal.

In the present invention, the logic gate 184 has a plurality of embodiments. In this embodiment, the logic gate 184 may be an AND grate (AG) and output an electric signal to the gate of the third switch 130 to control the switching on and off of the third switch 130. A waveform of the electric signal is substantially the same as the waveform of the clock signal, and thus the electric signal also has a highest voltage level and a lowest voltage level. In addition, the highest voltage level in the electric signal can mean the logic level "1", and the lowest voltage level of the electric signal can mean the logic level "0".

In the condition that the logic gate 184 is an AND gate, the electric signal output by the logic gate 184 will be at the highest voltage level when both the inverse clock signal and the inverse switch signal received by the logic gate 184 at the same time are at the highest voltage level (that is, meaning the logic level "1"). In contrast, when any one of the inverse clock signal and the inverse switch signal received by the logic gate 184 is at the lowest voltage level (that is, meaning the logic level "0"), the electric signal output by the logic gate 184 is at the lowest voltage level at this time.

It will be seen from this that the second control unit 180 can output the electric signal with the highest voltage level and the lowest voltage level from the output 184*c* of the logic gate 184 and use the electric signal to control the switching on and off of the third switch 130 to determine whether the output port 140 and the third voltage source V3 are to be electrically connected to each other according to the inverse clock signal from the inverter 162 and the switch signal generated by the comparator 164.

Figure 3:
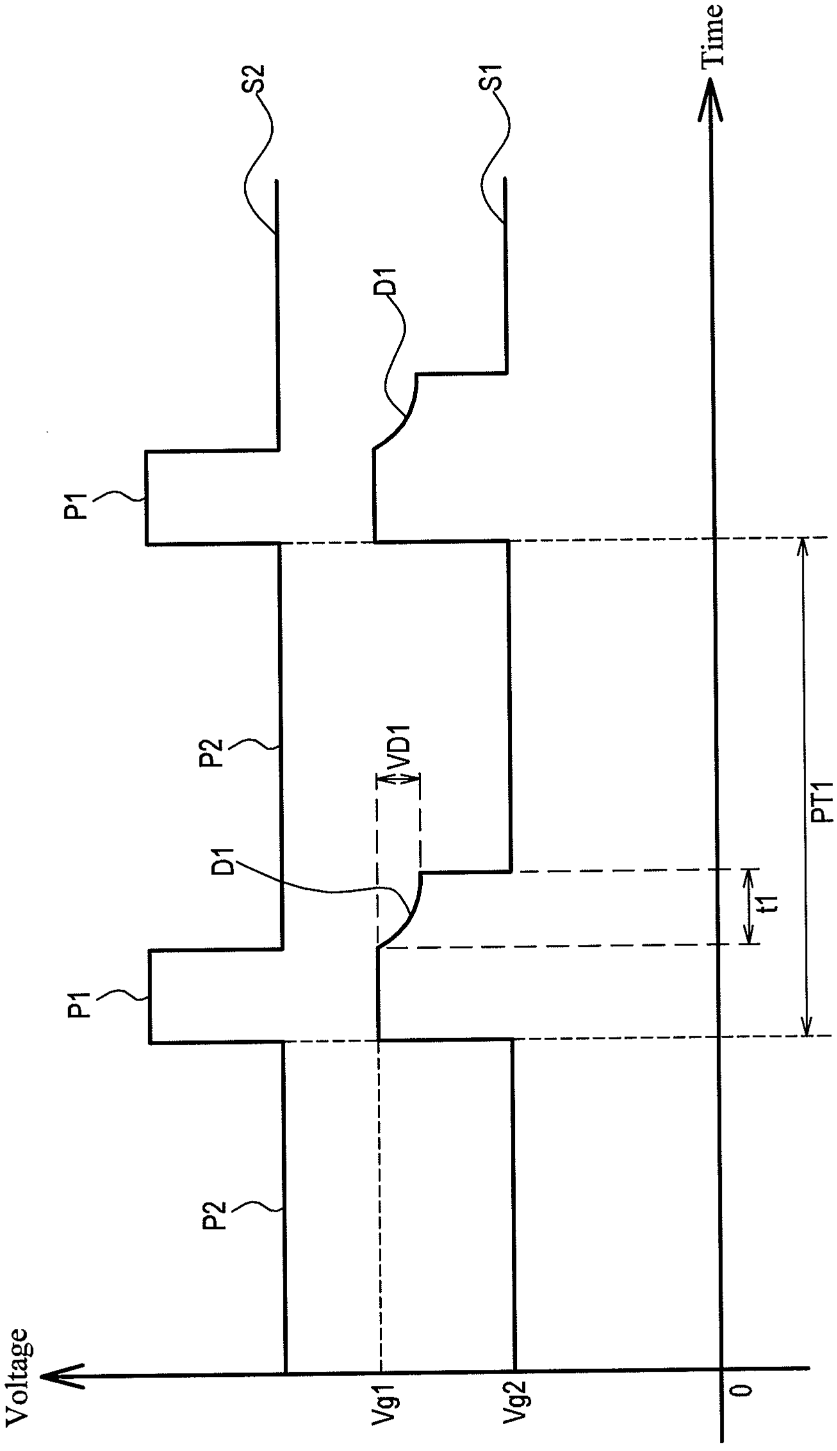
FIG. 3 is a schematic timing diagram of a shading signal and a clock signal output by the shading signal generating circuit in FIG. 2.

FIG. 3 is a schematic timing diagram of a shading signal and a clock signal output by the shading signal generating circuit in FIG. 2. Referring to FIG. 2 and FIG. 3, the shading signal generating circuit 100 can output a shading signal S1 from the output port 140. A clock signal S2 shown in FIG. 3 is received by the first switch 110. The clock signal S2 and the shading signal S1 substantially have the same period time PT1. That is to say, a frequency of the clock signal S2 is substantially the same as a frequency of the shading signal S1.

The shading signal S1 has a highest voltage level Vg1 and a lowest voltage level Vg2. The highest voltage level Vg1 may be generated by the first voltage source V1, and the lowest voltage level Vg2 may be generated by the second voltage source V2. In a period time PT1, the shading signal S1 has a voltage decay signal D1. The voltage decay signal D1 is output continuously for a period of time t1, and the voltage of the voltage decay signal D1 is reduced gradually from the highest voltage level Vg1 by a voltage difference VD1, as shown in FIG. 3.

The clock signal S2 includes a plurality of plus pulses P1 and a plurality of minus pulses P2. The plus pulses P1 have a highest voltage level, and the minus pulses P2 have a lowest voltage level. Therefore, the plus pulses P1 can mean the logic level "1", and the minus pulses P2 can mean the logic level "0". In addition, during that the shading signal generating circuit 100 works, the level shift unit 150 outputs the clock signal S2 to the first switch 110 and the first control unit 160.

When the first switch 110 receives the plus pulses P1 of the clock signal S2, the first switch 110 is switched on, so that the output port 140 is electrically connected to the first voltage source V1. When the first control unit 160 receives the plus pulses P1, the plus pulses P1 are transferred to the inverter 162 first. At this time, the inverter 162 converts the clock signal S2 to an inverse clock signal (not shown), so that the plus pulses P1 are converted to minus pulses of the inverse clock signal. That is to say, the inverse clock signal output by the inverter 162 is at the lowest voltage level.

Since the inverse clock signal output by the inverter 162 is at the lowest voltage level, the comparator 164 and the logic gate 184 receive the minus pulses of the inverse clock signal, so that both the switch signal output by the comparator 164 and the electric signal output by the logic gate 184 are at the lowest voltage level. Therefore, both the second switch 120 and the third switch 130 are off at this time, and neither the second voltage source V2 nor the third voltage source V3 is electrically connected to the output port 140.

It will be seen from this that when the plus pulses P1 of the clock signal S2 are input to the first switch 110 and the first control unit 160, only the first switch 110 is on, and both the second switch 120 and the third switch 130 are off, so that the output port 140 is only electrically connected to the first voltage source V1. Thus, only the first voltage source V1 supplies electric power to the output port 140, so that the shading signal S1 output by the output port 140 is at the highest voltage level Vg1.

When the level shift unit 150 outputs the minus pulses P2 of the clock signal S2, both the first switch 110 and the first control unit 160 receive the minus pulses P2. At this time, the first switch 110 is off, so that the output port 140 is not electrically connected to the first voltage source V1. The inverter 162 of the first control unit 160 converts the minus pulses P2 to the plus pulses of the inverse clock signal. That is to say, the inverse clock signal output by the inverter 162 is at the highest voltage level.

When the minus pulses P2 are just converted to the plus pulses of the inverse clock signal, the inverse clock signal received by the first input 184*a* from the inverter 162 is at the highest voltage level, and the inverter 162 starts charging the capacitor 166, so that the voltage level in the capacitor 166 rises gradually. At this time, the voltage level in the capacitor 166 is not higher than the voltage level of the reference voltage source V4, so that the switch signal output by the comparator 164 is still at the lowest voltage level. Therefore, the second switch 120 is still off, and the output port 140 is not electrically connected to the second voltage source V2.

The inverter 182 of the second control unit 180 converts the switch signal output by the comparator 164 to an inverse switch signal. In other words, when the switch signal output by the comparator 164 is at the lowest voltage level, the electric signal output by the inverter 182 is at the highest voltage level, so that the logic gate 184 receives the switch signal at the highest voltage level from the second input 184*b*.

It will be seen from this that when the minus pulses P2 are just converted to the plus pulses of the inverse clock signal, both the inverse clock signal received by the first input 184*a* and the electric signal received by the second input 184*b* are at the highest voltage level, so that the electric signal output by the logic gate 184 is also at the highest voltage level, thereby switching on the third switch 130 and enabling the output port 140 to be electrically connected to the third voltage source V3. Thus, the third voltage source V3 can supply electric power to the output port 140.

Since the resistor 170 is connected between the third voltage source V3 and the third switch 130 in series, the electric power supplied by the third voltage source V3 passes through the resistor 170 to the third switch 130. Therefore, when the third switch 130 is switched on, the voltage level of the shading signal S1 output by the output port 140 is reduced, so that the output port 140 outputs the voltage decay signal D1. The amplitude that the voltage level reduced (i.e. the value of the voltage difference VD1) is relative to the resistance of the resistor 170. The higher the resistance of the resistor 170 is, the lower the voltage difference VD1 is. In contrast, the lower the resistance of the resistor 170 is, the higher the voltage difference VD1 is.

It is especially noted that during that the level shift unit 150 outputs the minus pulses P2, the switch signal output by the comparator 164 is at the highest voltage level, so that the second switch 120 is switched on, thereby electrically connecting the output port 140 to the second voltage source V2 when the voltage level in the capacitor 166 is higher than the voltage level of the reference voltage source V4.

The switch signal output by the comparator 164 is at the highest voltage level, and the inverter 182 converts the switch signal to the inverse switch signal, so that the electric signal output by the inverter 182 to the second input 184*b* is at the lowest voltage level. Thus, the electric signal output by the logic gate 184 is at the lowest voltage level. At the moment, the third switch 130 is off, and the output port 140 is only electrically connected to the second voltage source V2.

Therefore, after keeping on the voltage decay signal D1 outputting for the period of time t1, the second voltage source V2 can supply electric power to the output port 140, so that the shading signal S1 output by the output port 140 is at the lowest voltage level Vg2. Additionally, the time t1 is relative to the capacitance of the capacitor 166. Specifically, the greater the capacitance of the capacitor 166 is, the longer the time t1 is. In contrast, the smaller capacitance of the capacitor 166 is, the shorter the time t1 is.

Base on the above mentioned-statement, since the shading signal generating circuit in the present invention uses the above three switches (i.e. the first switch, the second switch, and the third switch), the first control unit, the second control unit, and the resistor, the shading signal can be generated. Therefore, the shading signal generating circuit in the present invention can output the shading signal to a plurality of pixel units of a liquid crystal display panel, so as to reduce differences between the feedthrough voltages of the pixel units, thereby reducing the probability of the flicker of a frame.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shading signal generating circuit, applied to a liquid crystal display panel, and comprising:

an output port;

a first switch, electrically connected to the output port and a first voltage source, and receiving a clock signal, wherein when the clock signal switches on the first switch, the output port is electrically connected to the first voltage source;

a second switch, electrically connected to the output port and a second voltage source, wherein when the second switch is switched on, the output port is electrically connected to the second voltage source;

a first control unit, electrically connected to the second switch, and converting the clock signal to an inverse clock signal, wherein the first control unit outputs a switch signal according to the inverse clock signal, and the switch signal is used for switching on the second switch;

a resistor;

a third switch, electrically connected to the output port and the resistor, wherein the resistor is connected between a third voltage source and the third switch in series; when the third switch is switched on, the output port is electrically connected to the third voltage source, and the output port outputs a voltage decay signal; and a second control unit, electrically connected to the first control unit and the third switch, and switching on the third switch according to the inverse clock signal and the switch signal.

2. The shading signal generating circuit according to claim 1, wherein the first control unit comprises:

an inverter, electrically connected to the second control unit, and converting the clock signal to the inverse clock signal.

3. The shading signal generating circuit according to claim 2, wherein the first control unit further comprises:

a comparator, having an inverting input, a non-inverting input, and an output, wherein the non-inverting input is electrically connected to the inverter, the output is electrically connected to the second switch, and the switch signal is output from the output; and a capacitor, electrically connected to the inverter and the non-inverting input.

4. The shading signal generating circuit according to claim 1, wherein the second control unit comprises:

a logic gate, having a first input, a second input, and an output, wherein the first input is electrically connected to the first control unit and receives the inverse clock signal, and the output is electrically connected to the third switch; and an inverter, electrically connected to the second input.

5. The shading signal generating circuit according to claim 4, wherein the logic gate is an AND gate.

6. The shading signal generating circuit according to claim 1, wherein the first switch, the second switch, and the third switch are all field-effect transistors.

7. The shading signal generating circuit according to claim 6, wherein the first switch, the second switch, and the third switch are all n-type metal-oxide-semiconductor field-effect transistors.

8. The shading signal generating circuit according to claim 1, wherein a voltage level of the first voltage source is higher than a voltage level of the third voltage source, and the voltage level of the third voltage source is higher than a voltage level of the second voltage source.

9. The shading signal generating circuit according to claim 1, further comprising a level shift unit, wherein the level shift unit electrically connected to the first switch and the first control unit is used to convert an initial clock signal to the clock signal.

* * * * *